Nov. 18, 1947.  C. F. WALLACE  2,431,098
MECHANICAL MOVEMENT
Filed Jan. 7, 1944  3 Sheets-Sheet 1

INVENTOR.
Charles Frederick Wallace
BY
John C. Kerr
Attorney

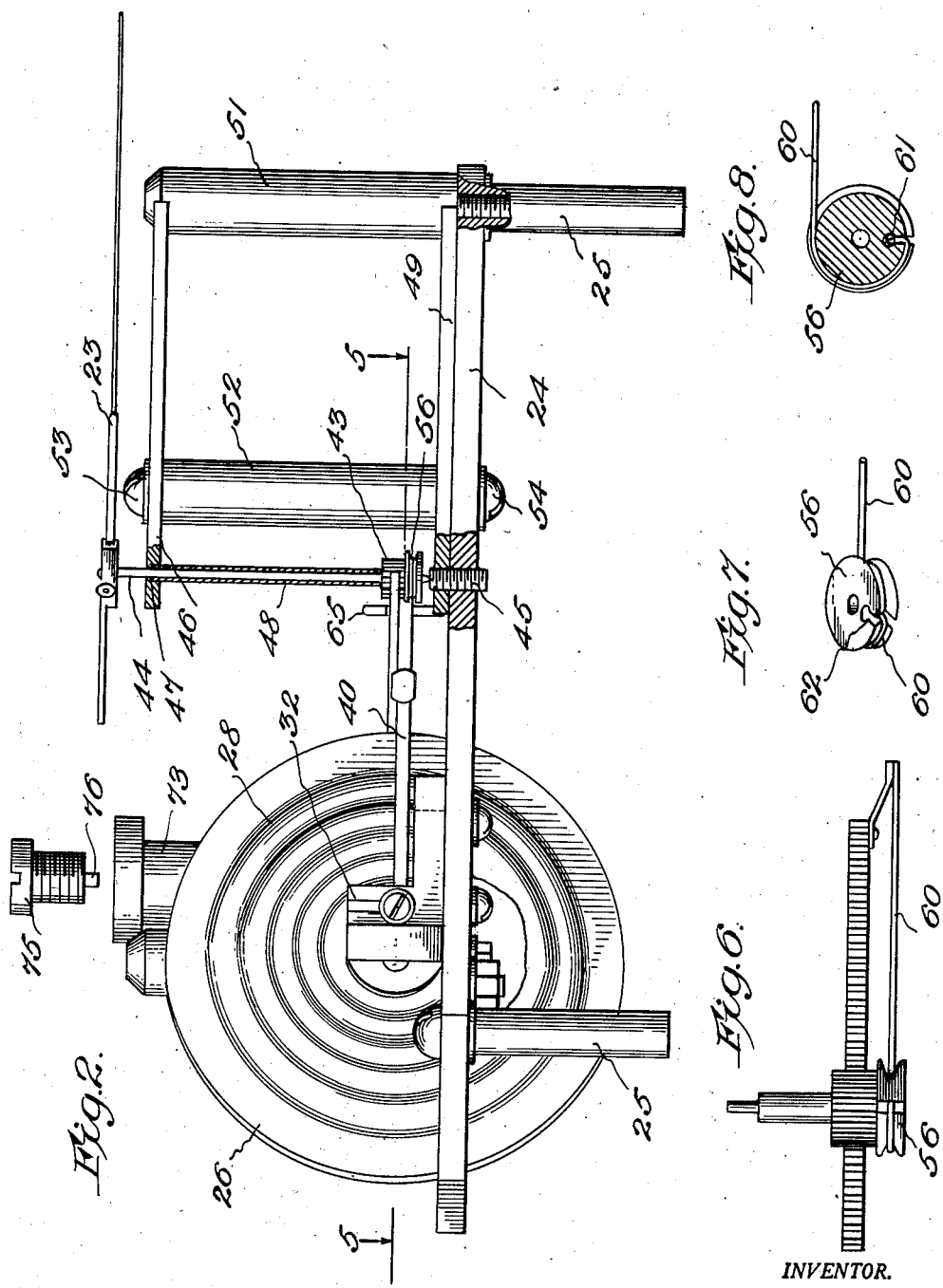

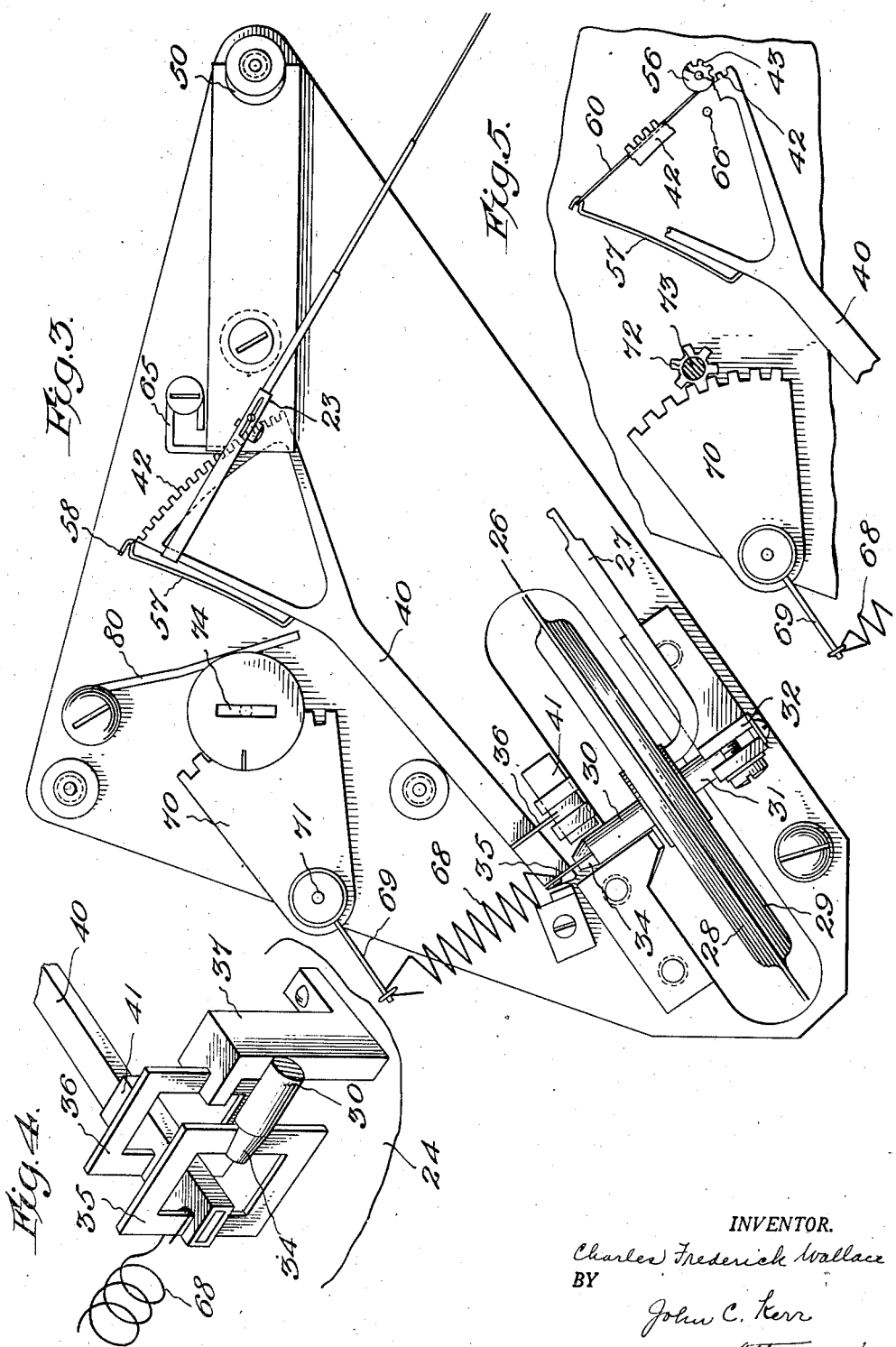

Patented Nov. 18, 1947

2,431,098

UNITED STATES PATENT OFFICE 2,431,098

MECHANICAL MOVEMENT

Charles Frederick Wallace, Westfield, N. J., assignor to Wallace & Tiernan Products, Inc., Belleville, N. J., a corporation of New Jersey Application January 7, 1944, Serial No. 517,411

5 Claims. (Cl. 74—90)

This invention relates principally to aneroid barometer apparatus, by which is meant pressure-responsive instruments for measuring or otherwise detecting atmospheric pressure or changes therein, and more specifically, instruments that include a sealed bellows or elastic box which is exposed to the gaseous medium, e. g. the atmosphere, and which provides mutual displacement of its opposite walls, for actuation of appropriate translating structure. It will be understood that as used herein, the term "barometer" is intended, unless otherwise expressed, to include altimeters or like apparatus for measuring or translating changes of pressure of the atmosphere surrounding the instrument. It will also be understood that the improvements herein disclosed are adapted for various types of aneroid barometer apparatus and also to other sensitive instruments, to effect or improve the translation of relatively small displacements of the bellows or capsule or other actuating means into adjustments of suitable indicating or recording means, e. g. a pointer or a corresponding element in recording devices of the depressor bar type.

In certain aspects, the present invention represents improvements in barometer apparatus of the character disclosed and claimed in my copending application Serial No. 412,121, filed September 24, 1941, for Aneroid barometer movement, now Patent No. 2,368,905, granted February 6, 1945; among other features, this patent discloses and claims a novel and particularly satisfactory structure of bellows-responsive operating means, including a rigid lever member, connected at closely spaced points at one end of such lever, to opposite sides of the bellows by means of stiff resilient spring elements which jointly provide the sole support for the lever. In its presently preferred forms, the apparatus of the present invention incorporates such structure, as will be hereinafter apparent.

Important objects of the present invention are to provide more sensitive, more accurate and simplified structure for aneroid barometer movements, and at the same time to provide apparatus which is durable and rugged and relatively unsusceptible of damage by accident or with rough handling. Further objects are to provide a simplified and highly efficient structure wherein backlash or play is avoided, while at the same time affording an arrangement wherein the range of pointer swing may be large or small, relative to the movement of the pressure-sensitive means, depending only upon the design of relatively simple structural elements.

To these and other ends, certain presently preferred structures and features of the invention are illustrated, by way of example, in the accompanying drawings, in which:

Fig. 2 is an enlarged side elevation of the mechanism removed from the case, but including the pointer and with certain parts cut away in vertical section;

Fig. 3 is a plan view of the apparatus shown in Fig. 2;

Fig. 4 is a fragmentary perspective view of the connections between the bellows and operating lever shown in Fig. 3;

Fig. 5 is a fragmentary plan and sectional view generally on line 5—5 of Fig. 2;

Fig. 6 is a fragmentary end elevation of part of the pointer shaft and associated parts shown in Fig. 2; and Figs. 7 and 8 are respectively perspective and horizontal sectional views of a pulley device mounted on the pointer shaft as shown in Figs. 2 and 6.

Figure 1:
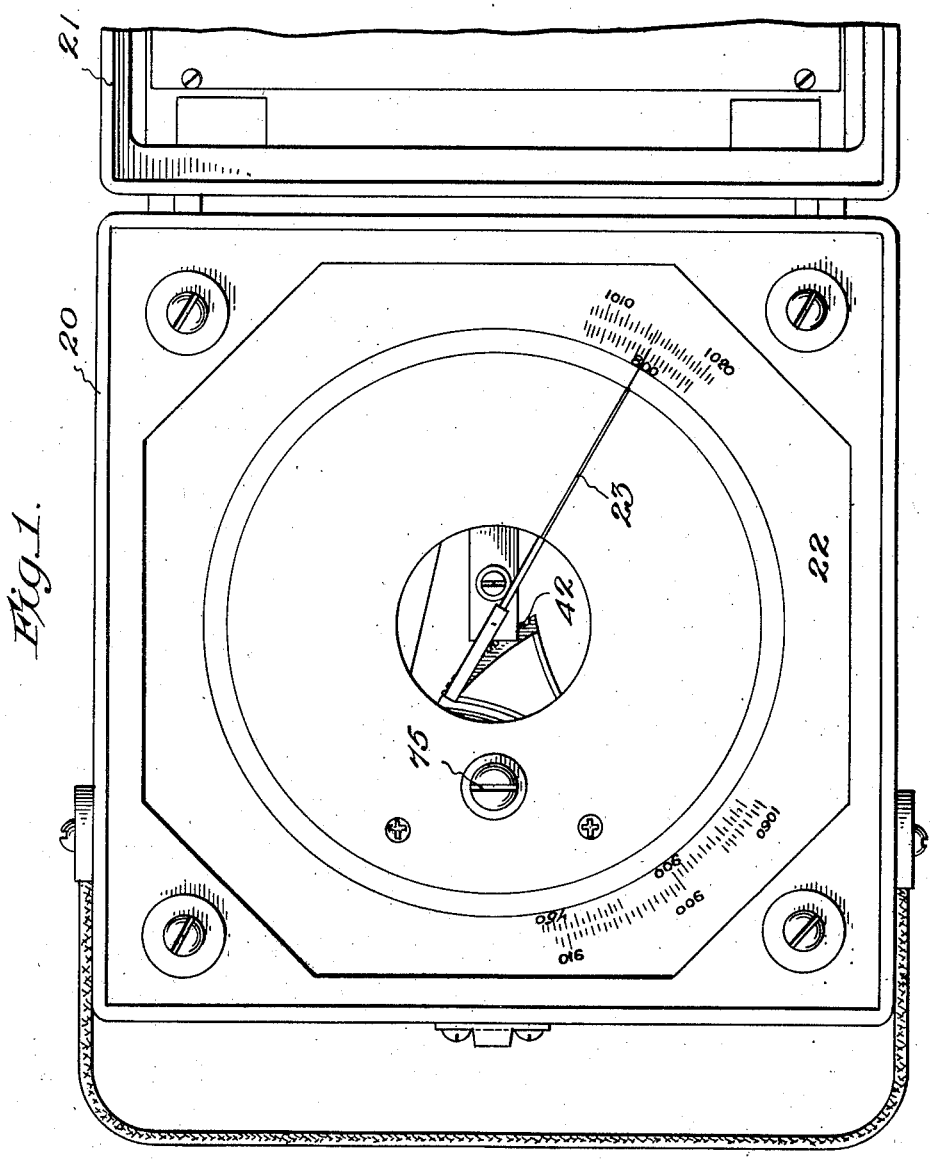
Fig. 1 is a plan view of a complete instrument, mounted in a portable case, with the cover shown open.

Although, as indicated hereinabove, the invention may be applied to various types of apparatus for measuring atmospheric pressure or altitude, or to any type of sensitive instrument involving recording or other translating structure, the invention is conveniently illustrated in a portable barometer such as shown in Fig. 1, having a case 20 with a hinged lid 21 which can be closed to cover the dial 22 of the instrument. It will be noted that the dial 22 may be appropriately graduated in inches or millimeters of mercury or in feet of altitude, or, as shown, in millibars of pressure, the graduations being disposed circularly to be traversed by the pointer 23.

Mounted on the under side of the dial 22 and in appropriately-spaced relation thereto, the operating structure comprises a rigid supporting plate or base 24, conveniently provided with legs 25 upon which the mechanism may be rested when it is removed from the case for testing, adjustment or other attention—see Figs. 2 and 3.

The pressure sensitive element comprises an elastic capsule or bellows generally designated 26 and comprising a pair of circularly corrugated, dish-shaped elements of thin, resilient metal, which are provided with flanges at their peripheries, the flanges being welded or otherwise appropriately secured together so as to constitute a sealed capsule of generally cylindrical, shallow configuration. It will be understood that the capsule is appropriately exhausted, as by means of the exhaust and sealing tube 27, so that the relative position of the opposite walls 28, 29 of the capsule is governed by the surrounding air or gas pressure, in the usual manner of such devices for aneroid barometers.

Rigid studs 30, 31 project, respectively, from the walls 28, 29 of the capsule, the stud 31 being rigidly but adjustably secured in a clamping bracket 32 mounted on the base 24. The other stud 30 has a tapered nose 34 provided with a vertical slot (see also Fig. 4) in which is forced and soldered one side of a hollow square or frame-like member 35 of thin, stiffly resilient sheet material, such as beryllium copper or the like. A similar hollow square or frame-like member 36, conveniently made of the same thin sheet material, is disposed closely adjacent to the member 35, and has one side similarly forced and soldered in a vertical groove of a projecting flange on a post 37 which is secured to the base 24. An operating lever or arm 40, for mechanically amplifying the relatively minute displacements of the bellows wall 28 relative to the wall 29, is conveniently wholly supported and actuated by the hollow square springs 35, 36. Although the element 40 may be so constructed that the members 35, 36 can be directly secured thereto in the manner of members 30 and 37, the lever 40 is conveniently made of aluminum (or aluminum alloy of high tensile strength—the base 24 and various connecting and mounting supports being advantageously made of the same material), and is fitted with a sleeve 41 of beryllium copper, bronze, brass or the like, at the end of the lever adjacent to the stud 30 and post 37. Vertical slots or grooves are conveniently provided at one side of the lever 40, extending through the sleeve 41, and the free or opposite sides of the square springs 35, 36 are respectively forced and soldered into the last-mentioned slots. The resulting structure, for example as shown in Fig. 4, provides a convenient support for the lever 40, and for immediate transmission thereto (and amplification thereby) of the displacements of the capsule, without back lash, sticking or other mechanical loss.

Although in some cases valuable results may be had with simple strap-like spring members intermediate the posts 30—37 and the lever 40, the open square or frame-like structures are of particular advantage in that they avoid weakening, rupture, or other effects of hysteresis or other derangement in the connection of the spring members to the studs and lever; instead of tending to bend back and forth relative to the supporting slots, the actual stress exerted by or upon the frame-like connectors is of a torsional character only, which does not tend to disturb, or to produce hysteresis in, the solder by which they are connected.

At its opposite end the lever 40 is integrally provided with a gear segment 42, arranged to mesh with a pinion 43 carried by the vertical spindle or shaft 44, which at its upper end carries the pointer 23. The lower end of the shaft 44 is appropriately pointed and constitutes with the upper end of a screw 45, a suitable needle bearing of practically friction-free character. A relatively loose and substantially frictionless bearing is also provided near the upper end of the shaft 44 by a transverse plate 46 (the upper bearing being designated 47), and to facilitate spacing and accurate bearing support, a sleeve 48 is conveniently slid down on the shaft, as shown, when the instrument is assembled and before the bearing plate 46 is put in place. It will be noted that the bearing aperture 47 includes an appropriate shoulder or seat for the upper end of the spacer sleeve 48. The lower bearing screw 45 is firmly threaded into a lower bearing plate 49. Both the bearing plates 46, 49 have, at remote ends, a semi-circular notch 50 (see Fig. 3) adjustably engaged with the surface of a cylindrical stud 51, which is provided for mounting the instrument to the panel 22. The plates 46, 49 are secured together and spaced by virtue of a spacer member 52 appropriately fastened to the plates by screws 53, 54. The screw 45 traverses, with a sloppy fit, an appropriate aperture in the base 24, and the screw 54 may also have a similar sloppy fit (not shown) in the base 24. It will be seen that in this way the assembly of bearing plates 46, 49 and spacer 52, carrying and pivoting the pointer 23 and its shaft 44, may be minutely adjusted for proper relation of the pinion 43 with the gear segment 42; and then the assembly is secured in place by tightening the screw 54.

In order to provide positive engagement of the gear segment 42 and pinion 43 at all times, without play or back lash, a novel and efficient structure is provided comprising a pulley 56 mounted on the pointer shaft 44, conveniently just below the pinion 43 and having the bottom of its cord-receiving groove conveniently in exact or approximate line with the pitch line of the pinion 43. At one side the lever 40 carries a long arm 57 of spring wire, to which is tied, at its hooked end 58, a thin flexible cord 60 (see also Fig. 6) which passes around and is fastened to the pulley. As shown in Figs. 7 and 8, the cord may conveniently be beaded or knotted at one end, and the bead seated in a hole 61 of the pulley, whence the cord passes through a slot 62 to the pulley surface; but other means for securing the cord to the pulley may be provided if desired. The cord is preferably of nylon or other substantially inelastic and highly flexible material, which is substantially unaffected by changes of temperature and humidity. It will be noted that by virtue of the spring tension of the long spring wire 57, the cord 60, drawn around the pulley 56, provides a constant tension or torque on the pointer assembly, substantially at the pitch line (or the end of the pitch diameter) of the pinion at all times. Thus the gearing is kept constantly in mesh without play or back lash, and at the same time the force exerted by the cord 60 is not only constant but substantially in the same direction, for all positions of the mechanism in its range of operation.

In order to prevent accidental bending or displacement of the lever 40, a wire guide 65 may be provided, extending above the lever and out of contact with it, at the gear segment portion thereof. To arrest the mechanism at the ends of its paths of travel, a suitable pin 66 may extend up from the base 24 in the triangular aperture of the lever adjacent to the gear segment, so that the pin will strike the sides of this aperture and arrest the lever at the ends of its path of travel. It will also be noted that the capsule or bellows 26 is conveniently seated in an elongated aperture in the base 24, the aperture sufficiently clearing the capsule at all points, so that the various supporting and operated instrumentalities are accurately mounted substantially in a plane with the center of the capsule.

For preliminary zero-set or calibration of the instrument, or for reset in use, a light coil spring 68 is hooked at one end to the spring hinge element 35 and at the other end to an adjustable arm 69, the arm 69 being moved by a gear segment 70 which is pivoted at 71. The gear segment 70 is actuated by an appropriate pinion 72 at the foot of a shaft 73, having in its head a suitable slot 74. When mounted in the case as shown in Fig. 1, an adjusting screw 75 is provided in the panel, having a downwardly projecting blade 76 for engaging the slot 74 (see Fig. 2). Thus upon turning the screw 75 and shaft 73, the arm 69 is moved toward and away from the capsule stud 30—thereby providing adjustment of the initial or other setting position of the lever 40 and of the capsule wall 28. It will be noted that by virtue of this construction, the setting adjustment does not affect the accuracy of the instrument, since the spring 68 pulls directly upon the capsule stud 30 at all times and since the spring naturally has the same rate in all positions of adjustment. A supplemental holding spring 80 may also be provided, as shown in Fig. 3, to maintain the shaft 73 in any desired position of adjustment.

Thus the spring 68, by its adjustment with the screw 75, may be used to adjust the needle position as may be necessary because of aging of the parts of the mechanism. As stated, the adjustment is directly and simply of the face position of the capsule and is without effect on the accuracy of the instrument, since the rate of the spring is necessarily constant and it is always a part of the mechanical system.

It will now be seen that the described structure provides an extremely simple and yet remarkably efficient movement for aneroid barometer apparatus. It is entirely free of play or back lash, and sticking or other effects of bearing friction are notably absent. In fact, the instrument is fully responsive at all times to pressure changes and there is no necessity for tapping or other manipulation, as is commonly required in aneroid barometers. By virtue of the stiff spring hinge construction embodying the members 35 and 36, movements of the capsule walls are immediately translated into an amplified displacement of the segment at the end of the lever 40, and with the play-free connection of the gearing, the pointer is likewise responsively adjusted. It will also be seen that the structure is such as to permit any of a wide variety of desired relations between extent of pointer sweep and pressure or displacement range of the capsule—simply, for example, by changing the pitch of the gears or within limits, the radius of the pinion 72 (or to some extent, the radius of the gear segment 42).

It is to be understood that the invention is not limited to the specific forms and operations herein disclosed by way of example, but may be carried out in other ways without departure from its spirit.

What is claimed is:

1. In a sensitive instrument of the character described, a displacement multiplying mechanism, comprising a lever adapted to be given a relatively small angular movement and by its length adapted to multiply the angular motion imparted thereto, a segmental rack carried by said lever at its outer end, a pinion meshing with said rack, a shaft carrying said pinion, and means fixedly connected both to said rack and to said shaft for opposing backlash, said means including a spring under substantially constant stress and a flexible filament maintained under substantially constant tension by said spring.

2. Apparatus according to claim 1, wherein the means fixedly connected both to said rack and to said shaft for opposing backlash, and including a spring and a flexible filament, further comprises a drum secured on said shaft and arranged to rotate with said pinion, said flexible filament being secured to and trained around said drum, and said spring securing said flexible filament to a point rigid with said rack.

3. Apparatus according to claim 1, wherein the means fixedly connected both to said rack and to said shaft for opposing backlash, and including a spring and a flexible filament, further comprises a drum having a diameter substantially equal to the pitch diameter of said pinion and mounted rigidly on said shaft and concentrically therewith, said flexible filament being secured to and trained around said drum, and said spring securing said flexible filament to a point rigid with said rack.

4. Apparatus according to claim 1 wherein the means fixedly connected both to said rack and to said shaft for opposing backlash, and including a spring and a flexible filament, further comprises a drum having a diameter substantially equal to the pitch diameter of said pinion and mounted rigidly on said shaft and concentrically therewith, and wherein said spring is a leaf spring secured at one end to a point on said lever and at its opposite end to said flexible filament, the connecting point between said filament and said leaf spring being so located that said filament will be extended away from said drum in a direction substantially parallel and aligned with the common tangent between said pinion and said segmental rack.

5. In a sensitive instrument of the character described, a displacement multiplying mechanism comprising a lever adapted to have an angular movement imparted thereto, a segmental rack carried by said lever, a pinion meshing with said rack so as to be rotated by the angular movement of said lever, a shaft carrying said pinion, a resilient member having one part connected to and moving with said lever and segmental rack, a part rotating with said shaft, a flexible filament connected at its ends to said resilient member and to a point fixed with respect to said shaft and adapted to be wound on said rotating part upon the rotation of said shaft, the diameter of said rotating part on which said filament is wound being so related to the point of attachment of said filament with said resilient member that said filament will be maintained under substantially constant tension throughout the operating range of the instrument.

CHARLES FREDERICK WALLACE.

REFERENCES CITED

The following references are of record in the file of this patent:

UNITED STATES PATENTS

| Number | Name | Date |
| --- | --- | --- |
| 2,150,771 | Kollsman | Mar. 14, 1939 |
| 2,162,308 | Jenny | June 13, 1939 |
| 2,178,799 | Loen | Nov. 7, 1939 |
| 2,166,595 | Jenny | July 18, 1939 |
| 2,354,301 | Corliss | July 25, 1944 |
| 1,080,160 | Owen | Dec. 2, 1913 |
| 1,694,188 | Lewis | Dec. 4, 1928 |

OTHER REFERENCES

A Treatise on the Aneroid, by Edward J. Dent, published in London by the author in 1849.